US008825932B1

(12) United States Patent
Day, Jr. et al.

(10) Patent No.: US 8,825,932 B1
(45) Date of Patent: Sep. 2, 2014

(54) OBTAINING VITAL PRODUCT DATA OF A NON-ACTIVE COMPONENT

(71) Applicant: International Business Machines Corporation, Armonk, NY (US)

(72) Inventors: James A. Day, Jr., Durham, NC (US); Cory D. Pate, Pflugerville, TX (US); Galan J. Willig, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/921,720

(22) Filed: Jun. 19, 2013

(51) Int. Cl.
*G06F 9/44* (2006.01)
*G06F 13/38* (2006.01)

(52) U.S. Cl.
CPC ............ *G06F 9/4411* (2013.01); *G06F 9/4415* (2013.01)
USPC ........... 710/104; 710/2; 710/5; 710/8; 710/31

(58) Field of Classification Search
CPC ......................................................... G06F 9/44
See application file for complete search history.

(56) References Cited

U.S. PATENT DOCUMENTS

| | | | |
|---|---|---|---|
| 5,625,562 A | 4/1997 | Veeneman et al. | |
| 2006/0129613 A1 | 6/2006 | Goodman et al. | |
| 2008/0244311 A1 | 10/2008 | Elliott et al. | |
| 2008/0277469 A1* | 11/2008 | Corriveau et al. | 235/385 |
| 2009/0210589 A1 | 8/2009 | Horvath et al. | |
| 2012/0127303 A1 | 5/2012 | Kangas et al. | |
| 2012/0185637 A1 | 7/2012 | Boecker et al. | |

FOREIGN PATENT DOCUMENTS

| | | |
|---|---|---|
| CN | 102353894 A | 2/2012 |
| JP | 2010272130 A | 12/2010 |

OTHER PUBLICATIONS

Mihai Bulea; "Barcode Reader Using 2D Touch Sensing"; IP.com Prior Art Database Technical Disclosure; Copyright 2008 Synaptics Incorporated; Publication Date Dec. 3, 2008; IPCOM000177036D; <http://www.ip.com/pubview/IPCOM000177036D>.
Cunha et al.; "The use of mobile devices with multi-tag technologies for an overall contextualized vineyard management"; Computers and Electronics in Agriculture; 73; 2010; pp. 154-164; Copyright 2010 Elsevier B.V.
IBM, "Early determination of the system type to support single firmware image on multiple systems", An IP.com Prior Art Database Technical Disclosure, Original publication date: Mar. 1, 2000, IP.com No. IPCOM000013685D, IP.com Electronic Publication Date: Jun. 18, 2003.

* cited by examiner

*Primary Examiner* — Scott Sun
(74) *Attorney, Agent, or Firm* — Nicholas L. Cadmus

(57) ABSTRACT

A computer system for obtaining vital product data (VPD) of a non-active component installed in the computer system. The computer system includes an active component, wherein the active component includes an optical sensor, wherein the optical sensor is positioned such that the optical sensor is able to scan an optically machine-readable representation of VPD of a non-active component when the non-active component is installed in the computer system, and wherein the non-active component includes the optically machine-readable representation of the VPD of the non-active component. The computer system is operable to scan the optically machine-readable representation of the VPD of the non-active component, decode the optically machine-readable representation of the VPD to determine the VPD of the non-active component, and store the determined VPD of the non-active component.

14 Claims, 5 Drawing Sheets

OBTAINING VITAL PRODUCT DATA OF A NON-ACTIVE COMPONENT

TECHNICAL FIELD

The present invention relates generally to computer systems management, and more specifically to obtaining vital product data of a non-active component of a computer system.

BACKGROUND

Vital Product Data (VPD) is a collection of configuration and informational data associated with a particular set of hardware or software. Vital Product Data (VPD) includes information such as part numbers, serial numbers, and engineering change levels. Not all components attached to a computing system will provide VPD, but it is often available from Peripheral Component Interconnect (PCI) and Small Computer System Interface (SCSI) components. Universal Serial Bus (USB) devices also provide similar data, but do not refer to it as VPD. Non-active components of a computer system, such as chassis, cables, pluggable modules, and some planars, contain no active circuitry or transistors onboard and no memory containing VPD to be read by the Integrated Management Module (IMM) for configuration and informational data (e.g., Part Numbers).

VPD data is typically stored on Electrically Erasable Programmable Read-Only Memory (EEPROM), or other types of memory, on the hardware components, or can be queried through attached I2C or other BUS interfaces. The VPD is used by firmware to determine the nature of the system hardware and to shield the operation of the firmware from minor changes and variations of hardware implementations within a given machine model number.

A computer system board typically includes firmware to provide a Unified Extensible Firmware Interface (UEFI) or alternatively the BIOS, diagnostics code such as Dynamic System Analysis (DSA), and IMM. The IMM works with system firmware (UEFI) to provide system management functions. The basic functionality of the firmware is tailored to the specific system on which it runs.

SUMMARY

According to one embodiment of the present invention, a computer system for obtaining vital product data (VPD) of a non-active component installed in the computer system. The computer system includes an active component, wherein the active component includes an optical sensor, wherein the optical sensor is positioned such that the optical sensor is able to scan an optically machine-readable representation of VPD of a non-active component when the non-active component is installed in the computer system, and wherein the non-active component includes the optically machine-readable representation of the VPD of the non-active component. The computer system also includes one or more computer processors and one or more computer-readable storage media. The computer system is operable to scan the optically machine-readable representation of the VPD of the non-active component, decode the optically machine-readable representation of the VPD to determine the VPD of the non-active component, and store the determined VPD of the non-active component.

According to another embodiment of the present invention, a method for obtaining vital product data of a non-active component installed in a computer system. The method includes a computer system causing an optical sensor on an active component of the computing system to scan an optically machine-readable representation of VPD of a non-active component of the computer system, wherein the optical sensor is positioned such that the optical sensor is able to scan any optically machine-readable representation of VPD of any non-active component when installed in the computer system. The method further includes decoding the optically machine-readable representation of the VPD to determine the VPD of the non-active component. The method further includes storing the determined VPD of the non-active component.

DETAILED DESCRIPTION

Figure 1:
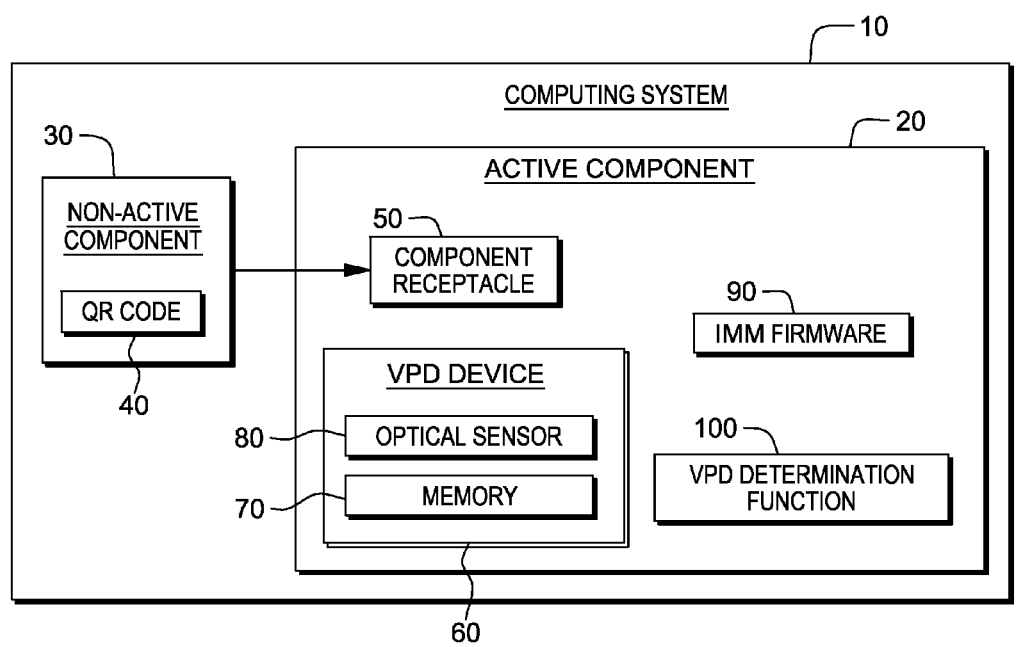
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the figures.

FIG. 1 illustrates a computing system in which the present invention may be implemented. FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes active component 20 and non-active component 30. Active component 20 is the main printed circuit board containing at least the central processing unit (CPU) for computing system 10. In other embodiments, active component 20 may be a daughterboard, an expansion card, or any other component of computing system 10 that contains transistors or active circuitry. In the depicted embodiment, active component 20 contains various hardware components and connecting circuitry, and stores various data, settings, and firmware instructions necessary for computing system 10 to operate.

In the depicted embodiment, non-active component 30 is an expansion card that does not contain transistors or active circuitry, and does not contain memory containing vital product data (VPD). In other embodiments, non-active component 30 may be a midplane, riser card, expansion card, planar, adapter card, chassis, cable, module, or any other component of computing system 10 that does not contain transistors or active circuitry, and does not contain memory containing VPD. Non-active component 30 includes Quick Response (QR) code 40 located on a surface of non-active component 30. In the depicted embodiment, QR code 40 is a two-dimensional barcode that is an optically machine-readable representation of VPD relating to non-active component 30 ("QR Code" is registered trademark of DENSO WAVE INCORPORATED). In other embodiments, QR code 40 may be a standard barcode or any other optically machine-readable representation of data relating to non-active component 30. The information encoded by a QR code may be made up of standardized types of data. The types may be numeric, alphanumeric, byte or binary, or, through supported extensions, virtually any other type.

In the depicted embodiment, active component 20 also contains component receptacle 50, VPD device 60, memory 70, optical sensor 80, Integrated Management Module (IMM) firmware 90, and VPD determination function 100.

Component receptacle 50 is an electrical connector or expansion slot connected to active component 20 which allows for non-active component 30 to be electrically connected to active component 20. In the depicted embodiment, component receptacle 50 is an I/O expansion slot. In other embodiments, non-active component 30 may not need to be electrically connected to active component 20. In the depicted embodiment, non-active component 30 is removably attached to active component 20 by component receptacle 50.

VPD device 60 is a device attached to active component 20 capable of scanning and decoding optically machine-readable representations of data, such as QR codes or standard barcodes, relating to non-active component 30. In various embodiments, the software to decode the optically machine-readable representations of data, such as QR codes or standard barcodes, may be implemented as firmware on VPD device 60 or as part of VPD determination function 100. There are several standards for encoding data as QR codes which may be utilized to encode VPD of non-active component 30. For example, alphanumeric characters may be encoded as QR codes.

In the depicted embodiment, VPD device 60 includes optical sensor 80 and memory 70. Optical sensor 80 is a device that converts an optical image into an electrical signal. The electrical signals are quantized by an analog-to-digital (A/D) converter (not shown). In one embodiment, optical sensor 80 may be a charge-coupled device (CCD) sensor. In another embodiment, optical sensor 80 may be a complementary metal-oxide semiconductor (CMOS) sensor or another type of sensor. Memory 70 is a repository where data scanned by optical sensor 80 is stored after the data has been decoded. In the depicted embodiment, memory 70 is Non-volatile random-access memory (NVRAM). In other embodiments, memory 70 may be any type of non-volatile memory, such as flash memory or Electrically Erasable Programmable Read-Only Memory (EEPROM).

Figure 3:
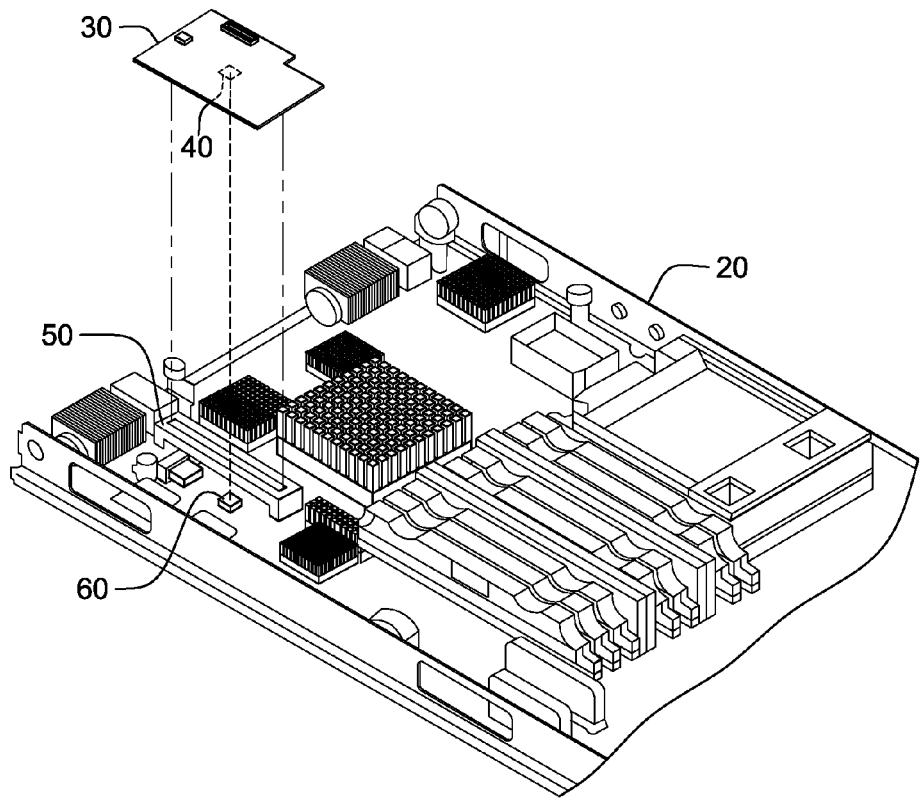
FIG. 3 depicts the positioning of an active component and a non-active component as the computing system of FIG. 1 is assembled, in accordance with an illustrative embodiment of the present invention.
Figure 4:
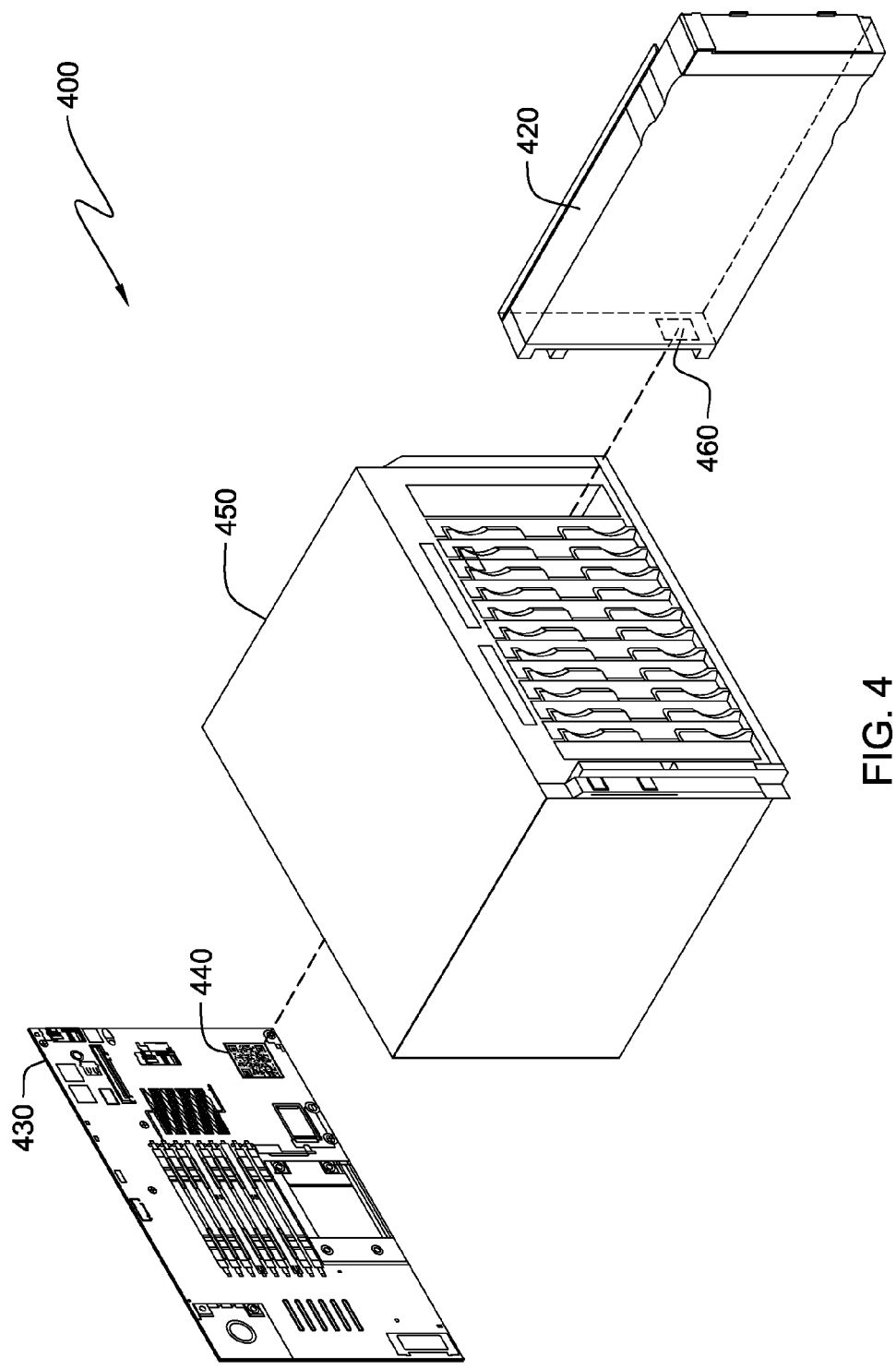
FIGS. 4 and 5 depict the positioning of other active components and non-active components as other computing systems are assembled, in accordance with other illustrative embodiments of the present invention.
Figure 5:
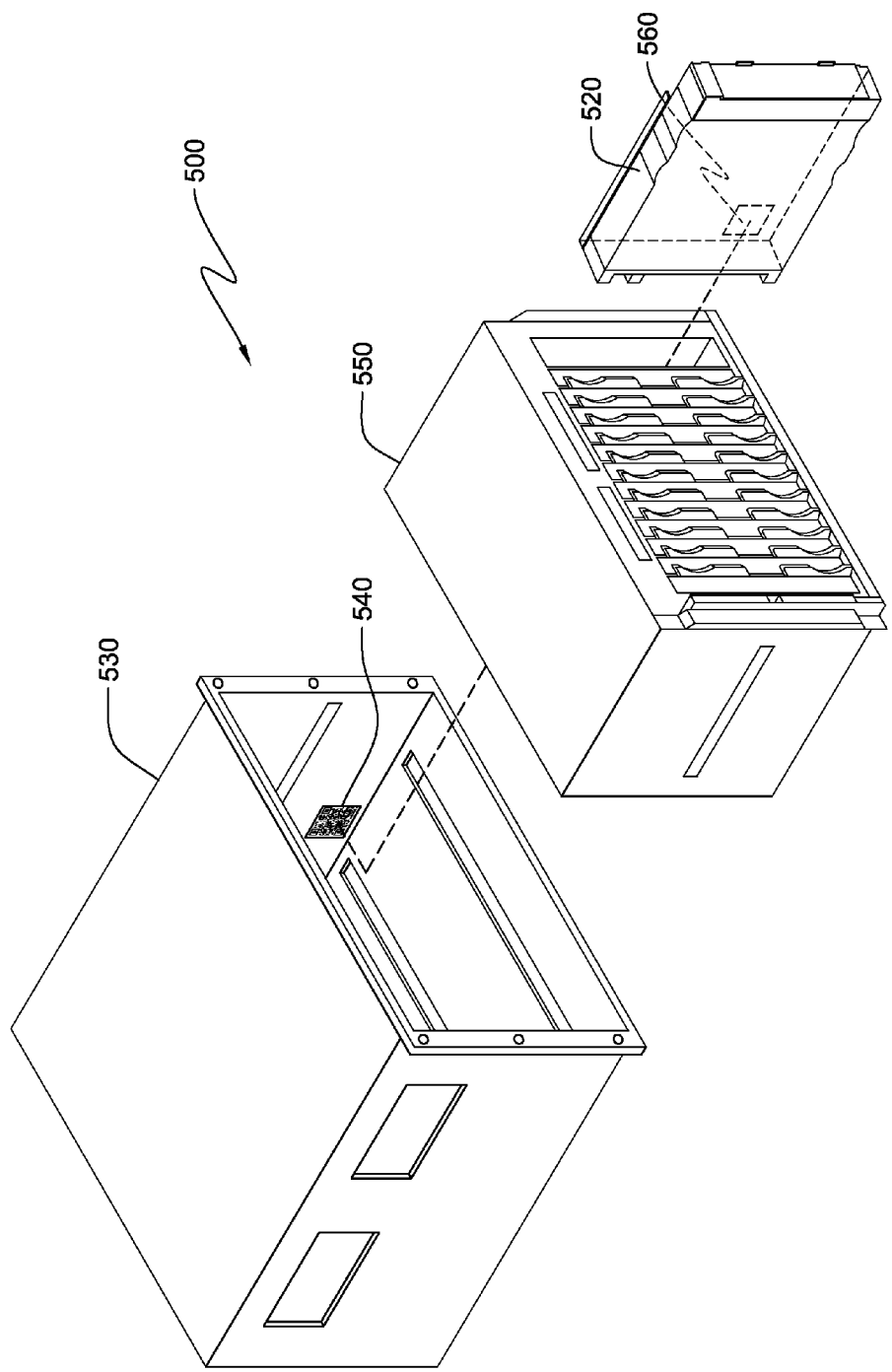

In various embodiments, when computing system 10 is assembled, active component 20 and non-active component 30 are positioned such that optical sensor 80 of VPD device 60 on active component 20 is able to scan QR code 40 on a surface of non-active component 30. FIG. 3 depicts the positioning of active component 20 and non-active component 30 as computing system 10 is assembled, in accordance with an illustrative embodiment of the present invention. FIGS. 4 and 5 depict the positioning of other active components and non-active components as other computing systems are assembled, in accordance with other illustrative embodiments of the present invention.

Also included in the depicted embodiment is IMM firmware 90. IMM firmware 90 manages computing system 10. The IMM replaces the baseboard management controller (BMC) and consolidates the service processor functionality, Super I/O, video controller, and remote presence capabilities in a single chip on a server system board, such as active component 20. IMM firmware 90 is the instructions and routines that perform these functionalities. In other embodiments, IMM firmware 90 may be any firmware that operates to manage a computing system. For example, IMM firmware 90 may work with system firmware (e.g., Unified Extensible Firmware Interface (uEFI)) to provide system management functions. uEFI firmware may establish routines and parameters for communication between system hardware and operating system software. uEFI firmware may also define an interface between the operating system and other platform firmware. uEFI firmware can take the place of traditional Basic Input/Output System (BIOS) firmware. In another embodiment, BIOS firmware resides on the system board, and uEFI firmware executes on top of the BIOS.

VPD determination function 100 operates to obtain VPD of non-active component 30. In one embodiment, VPD determination function 100 initiates a scan of QR code 40 on a surface of non-active component 30. QR code 40 is decoded to retrieve the VPD of non-active component 30. The decoded VPD of non-active component 30 is stored to memory 70 where it may be accessed by any program or system function, such as IMM firmware 90.

VPD determination function 100 may also cause periodic scans of QR code 40 on a surface of non-active component 30. QR code 40 is decoded to retrieve the VPD of non-active component 30. The periodic scans may take place at any interval of time. For example, the scans may take place every hour, every thirty minutes, every minute, or at each computing system power on. This periodic scanning may allow certain non-active components to be added or removed, and have the computing system update VPD without powering down. The decoded VPD of non-active component 30 is compared to the previously stored VPD in memory 70. If the newly decoded VPD does not match the stored VPD in memory 70, VPD determination function 100 may alert a program, system function, or system manager, such as an IMM. VPD determination function 100 can be written in various programming languages including low-level, high-level, object-oriented or non object-oriented languages. Alternatively, the functions of VPD determination function 100 can be implemented in whole or in part by computer circuits and other hardware.

In the depicted embodiment, VPD determination function 100 is a separate program that resides on active component 20. In another embodiment, VPD determination function is part of IMM firmware 90. In yet another embodiment, VPD determination function 100 may be stored as firmware stored for operation on VPD device 60.

Figure 2:
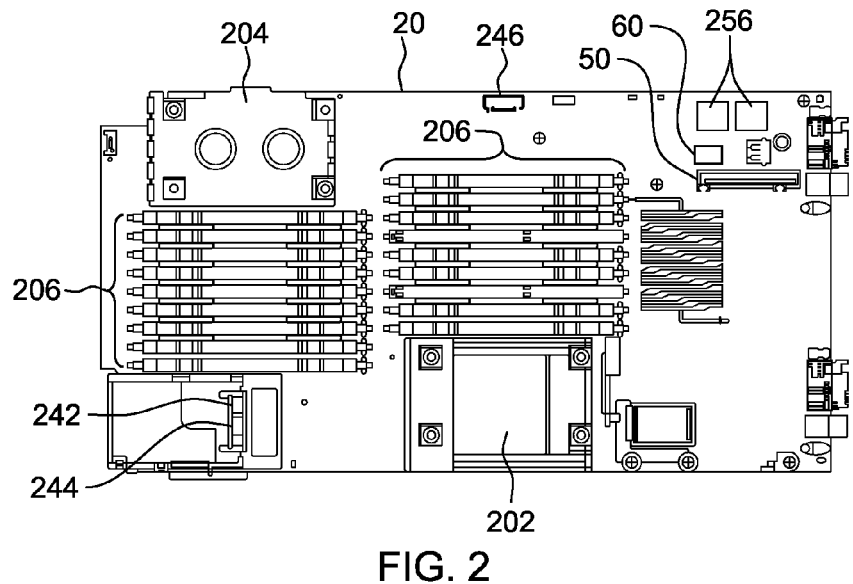
FIG. 2 depicts components of the active component of FIG. 1, in accordance with one embodiment of the present invention.

FIG. 2 depicts components of active component 20 in accordance with one embodiment of the present invention. It should be appreciated that FIG. 2 provides only an illustration of one implementation and does not imply any limitations with regard to the environments in which different embodiments may be implemented. Many modifications to the depicted environment may be made.

In the depicted embodiment, active component 20 is the main printed circuit board containing at least the central processing unit (CPU) for computing system 10. For example, active component 20 is the system board of a data storage blade in an IBM® BladeCenter®. In other embodiments, active component 20 may be the system board of any computer system.

Active component 20 includes a communications fabric (not shown), which provides communications between computer processors 202 and 204, RAMs 206, computer-readable storage media 242, 244, and 256, component receptacle 50, and VPD device 60. The communications fabric can be implemented with any architecture designed for passing data and/or control information between processors (such as microprocessors, communications and network processors, etc.), system memory, peripheral devices, and any other hardware components within a system. For example, the communications fabric can be implemented with one or more buses.

Active component 20 includes processors 202 and 204. Processors 202 and 204 execute instructions of the operating system and program instructions of both software and firmware, including VPD determination function 100 and IMM firmware 90 on active component 20. VPD determination function 100, IMM firmware 90, and other data, settings, and firmware instructions necessary for computing system 10 to operate are stored on one or more computer-readable storage media 242, 244, and 256 for execution by one or more of processors 202 and 204 via one or more respective RAMs 206 (which typically include cache memory). In the depicted embodiment, RAM 206 includes dual in-line memory modules (DIMM). In another embodiment RAM 206, such as a cache memory, may come as an onboard chip. Other processors may exist to operate program instructions. For example, the IMM (and hence IMM firmware 90) runs on its own embedded processor separate from system board processors 202 and 204. Since, in some embodiments, the IMM is responsible for obtaining VPD; such a processor may also run VPD determination function 100.

In the depicted embodiment of FIG. 2, computer-readable storage media 242, 244, and 256 include solid-state drives (242 and 244) and onboard chips (256). Alternatively, any of computer-readable storage media 242, 244, and 256 may be a magnetic disk storage device of an internal hard drive, a semiconductor storage device such as ROM, EPROM, flash memory or any other computer-readable storage media that can store a computer program and digital information. Firmware and system settings are stored in non-volatile memory, preferably in onboard chips 256. Typically, onboard chips 256 used for firmware are flash ROM.

Battery 246 provides back-up power to RAM 206 when it is desirable for RAM 206 to be non-volatile.

Other embodiments may include additional internal components, such as a R/W drive or interface to read from and write to one or more portable computer-readable storage media such as a CD-ROM, DVD, memory stick, magnetic tape, magnetic disk, optical disk or semiconductor storage device. Internal components may also include a network adapter or interface such as a TCP/IP adapter card, to connect the system to other systems and devices in a network. The network may comprise copper wires, optical fibers, wireless transmission, routers, firewalls, switches, gateway computers and/or edge servers.

Other embodiments may also include external components such as a computer display monitor, a keyboard, and a computer mouse. In such an embodiment, internal components include device drivers to interface to the computer display monitor, the keyboard, and the computer mouse.

FIG. 3 depicts the positioning of active component 20 and non-active component 30 as computing system 10 is assembled, in accordance with an illustrative embodiment of the present invention. In this illustrative embodiment, non-active component 30 is an expansion card that does not contain transistors or active circuitry, and does not contain memory containing vital product data (VPD). As shown, QR code 40 is on the bottom surface of non-active component 30. Active component 20 is a main printed circuit board containing at least the central processing unit (CPU) for computing system 10. For example, active component 20 is the system board of a data storage blade in an IBM® BladeCenter®. As shown, VPD device 60, including optical sensor 80, is attached to active component 20 near component receptacle 50. Component receptacle 50 is an expansion slot connected to active component 20.

Non-active component 30 joins with active component 20 by sliding into component receptacle 50. As shown, when non-active component 30 joins with active component 20, active component 20 and non-active component 30 are positioned such that VPD device 60, including optical scanner 80, on active component 20 is able to scan QR code 40 on the bottom surface of non-active component 30.

FIGS. 4 and 5 depict the positioning of other active components and non-active components as other computing systems are assembled, in accordance with other illustrative embodiments of the present invention.

FIG. 4 depicts the positioning of active component 420 and non-active component 430 as computing system 400 is assembled, in accordance with another illustrative embodiment. In this illustrative embodiment, computing system 400 is an IBM® BladeCenter®. Non-active component 430 is a non-active midplane. Midplanes are used to accept system processing cards on one side of the chassis and accept network interface cards on the other side of the chassis. As shown, QR code 440 is on the surface of non-active component 430 that will accept active component 420. Active component 420 is an Advanced Management Module (AMM). The AMM is a hot-swap BladeCenter® module that is used to configure and manage all installed BladeCenter® components. Shuttle 450 is a component that operates to hold active component 420 in place when computing system 400 is assembled. As shown, VPD device 460, including an optical sensor, is attached to the surface of active component 420 where active component 420 will connect to non-active component 430.

Active component 420 joins with non-active component 430 by sliding into shuttle 450 and connecting with non-active component 430 which will be located adjacent to the back side of shuttle 450. As shown, when active component 420 joins with non-active component 430, active component 420 and non-active component 430 are positioned such that VPD device 460, including an optical scanner, on active component 420 is able to scan QR code 440 on the surface of non-active component 430 that will accept active component 420.

FIG. 5 depicts the positioning of active component 520 and non-active component 530 as computing system 500 is assembled, in accordance with yet another illustrative embodiment. In this illustrative embodiment, computing system 500 is an IBM® BladeCenter®. Non-active component 530 is a chassis of a BladeCenter®. As shown, QR code 540 is on an internal surface of non-active component 530 that will be adjacent to active component 520 when computing system 500 is assembled. Active component 520 is an Advanced Management Module (AMM). The AMM is a hot-swap BladeCenter® module that is used to configure and manage all installed BladeCenter® components. Shuttle 550 is a component that operates to hold active component 520 in place when computing system 500 is assembled. As shown, VPD device 560, including an optical sensor, is attached to the surface of active component 520 that will be adjacent to the internal surface of non-active component 530 with QR code 540.

Active component 520 is placed adjacent to non-active component 530 by sliding into shuttle 550 when shuttle 550 is placed inside of non-active component 530. As shown, when active component 520 is placed adjacent to non-active component 530, active component 520 and non-active component 530 are positioned such that VPD device 560, including an optical scanner, on active component 520 is able to scan QR code 540 on the internal surface of non-active component 530.

Figure 6:
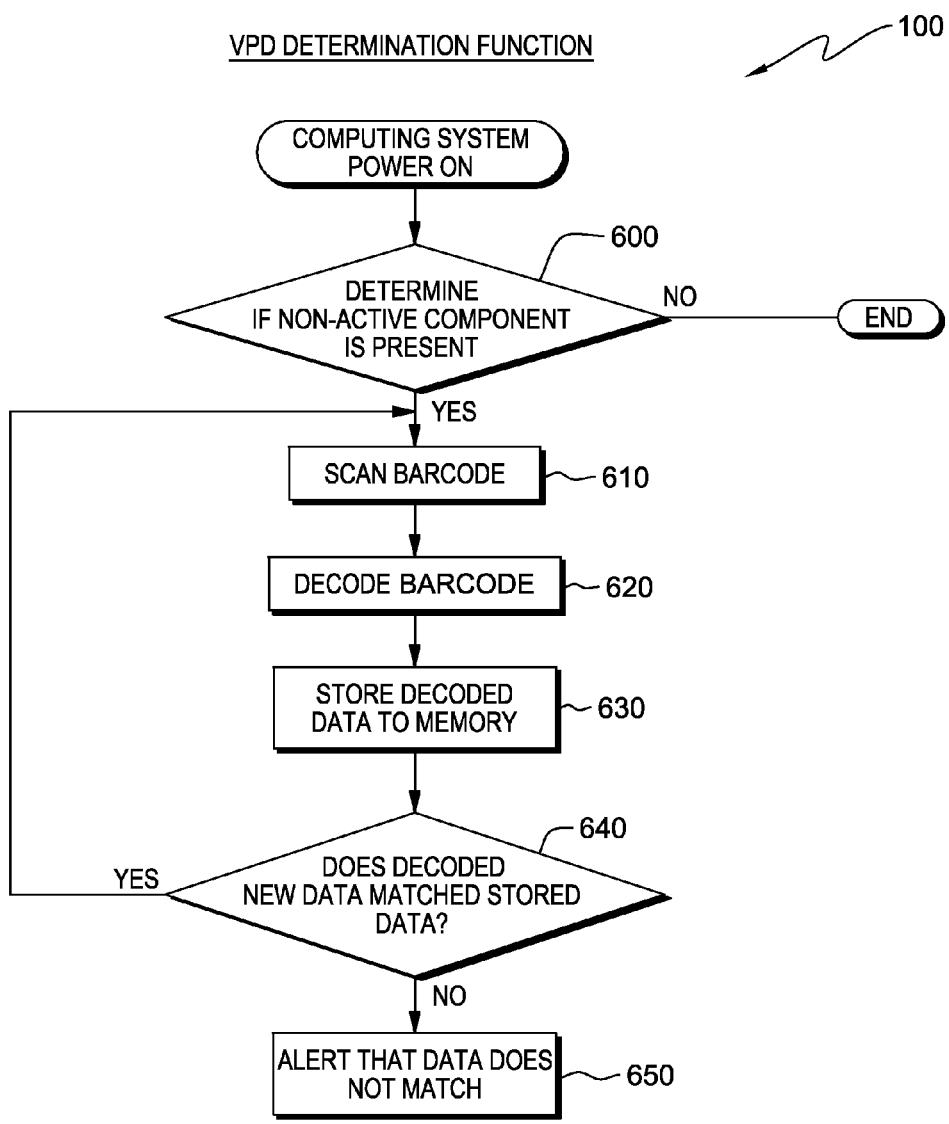
FIG. 6 depicts a flowchart of the steps of a VPD determination function executing within the computing system of FIG. 1, for obtaining VPD of a non-active component, in accordance with one embodiment of the present invention.

FIG. 6 depicts a flowchart of the steps of VPD determination function 100 executing within the computing system of FIG. 1, for obtaining VPD of non-active component 30, in accordance with one embodiment of the present invention.

In one embodiment, initially, computing system 10 is assembled as previously discussed. As assembled, active component 20 and non-active component 30 are positioned such that optical sensor 80 of VPD device 60 on active component 20 is able to scan a barcode (e.g., QR code 40) on a surface of non-active component 30.

In decision 600, VPD determination function 100 determines if non-active component 30 is present. In one embodiment, in a power-on sequence, VPD determination program 100 detects the presence (or absence) of non-active component 30. For example, if non-active component 30 is an expansion card, a present pin of an expansion slot (e.g., component receptacle 50) connected to active component 20 indicates through a change in voltage, current, or resistance when an expansion card is inserted. This change may be detected by VPD determination function 100 or it may be detected by IMM firmware 90 and then an indication may be sent by IMM firmware 90 to VPD determination function 100. In other embodiments, if non-active component 30 is a component that is not electrically connected to active component 20, a user may manually indicate that non-active component 30 is present. In yet another embodiment, VPD determination function 100 may cause a scan by VPD device 60 to determine if non-active component 30 is present. If the scan by VPD device 60 detects a barcode (e.g., QR code) then VPD determination function 100 proceeds to step 620.

If VPD determination function 100 determines that non-active component 30 is not present (decision 600, no branch), VPD determination program 100 ends. In other embodiments, VPD determination program 100 may cause periodic scans by VPD device 60. If VPD determination function 100 determines that non-active component 30 is present (decision 600, yes branch), VPD determination function 100 proceeds to step 610.

In step 610, VPD determination function 100 scans a barcode (e.g., QR code 40) on a surface of non-active component 30. In one embodiment, VPD determination function 100 causes the scan by sending an I2C command to optical sensor 80 of VPD device 60. The optical image of the barcode (e.g., QR code 40) is captured by optical sensor 80 and converted into an electrical signal. The electrical signals are quantized by an analog-to-digital (A/D) converter and sent to VPD determination function 100.

In step 620, VPD determination function 100 decodes the barcode (e.g., QR code 40). In one embodiment, VPD determination function 100 receives the electrical signals from optical sensor 80 and determines the VPD represented by the barcode. VPD determination function 100 utilizes the standard used for encoding data as the barcode (e.g., a QR code) to decode the barcode. In other embodiments, the barcode (e.g., QR code 40) is decoded at VPD device 60 and the VPD is sent to VPD determination function 100.

In step 630, VPD determination function 100 stores the decoded VPD, represented by the barcode, to memory 70. In one embodiment, if there was no VPD previously stored in memory 70, VPD determination function 100 stores the decoded VPD to memory 70 and returns back to step 610. If there was VPD previously stored to memory 70, VPD determination function 100 stores the new decoded VPD to memory 70 and proceeds to decision 640.

In decision 640, VPD determination function 100 determines if the new decoded VPD matches VPD previously stored in memory 70. In one embodiment, VPD determination function 100 compares the new decoded VPD to the VPD previously stored in memory 70. For example, a character-by-character comparison may be done for the comparison.

If the new decoded VPD does not match the VPD previously stored in memory 70 (decision 640, no branch), VPD determination function 100 alerts that the new decoded VPD does not match the VPD previously stored (step 650). In one embodiment, VPD determination function 100 sends an indication to IMM firmware 90 that the new decoded VPD does not match the VPD previously stored. For example, the indication may be an interrupt sent from VPD determination function 100 to IMM firmware 90. In one embodiment, after step 650, VPD determination function 100 may return back to step 610.

If the new decoded VPD does match the VPD previously stored in memory 70 (decision 640, yes branch), VPD determination function 100 returns back to step 610. In one embodiment, there may be a pause before step 610 is executed again. The length of the pause will be dictated by the interval of time between periodic scans chosen. The program loop may continue indefinitely or end at a preselected moment. For example, the preselected moment may be computing system 10 shutdown or when the program has looped a preselected number of times.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for obtaining vital product data (VPD) of a non-active component installed in the computer system, the computer system comprising:
   an active component, wherein the active component includes an optical sensor, wherein the optical sensor is positioned such that the optical sensor is able to scan an optically machine-readable representation of VPD of a non-active component when the non-active component is installed in the computer system, wherein the non-active component includes the optically machine-readable representation of the VPD of the non-active component;
   one or more computer processors;
   one or more computer-readable storage media;
   wherein the computer system is operable to:
   scan the optically machine-readable representation of the VPD of the non-active component;
   decode the optically machine-readable representation of the VPD to determine the VPD of the non-active component; and
   store the determined VPD of the non-active component.

2. The computer system of claim 1, wherein the optically machine-readable representation of the VPD of the non-active component is a QR code.

3. The computer system of claim 1, wherein the optically machine-readable representation of the VPD of the non-active component is a barcode.

4. The computer system of claim 1, wherein the computer system is further operable to:
   determine that the determined VPD of the non-active component does not match a previously stored VPD; and
   alert that the determined VPD of the non-active component does not match the previously stored VPD and that the non-active component corresponding to the determined VPD has been installed.

5. The computer system of claim 1, wherein the non-active component is a component that does not contain transistors or active circuitry, and does not contain memory containing VPD.

6. The computer system of claim 5, wherein the component that does not contain transistors or active circuitry, and does not contain memory containing VPD is selected from the group consisting of an expansion card, midplane, riser card, planar, chassis, cable, and adapter card.

7. The computer system of claim 1, wherein the computer system is further operable to:
   determine that the determined VPD of the non-active component does not match a previously stored VPD; and alert that the determined VPD of the non-active component does not match the previously stored VPD and that a non-active component corresponding to the previously stored VPD has been removed.

8. A method for obtaining vital product data of a non-active component installed in a computer system, the method comprising the steps of:
- a computer system causing an optical sensor on an active component of the computing system to scan an optically machine-readable representation of VPD of a non-active component of the computer system, wherein the optical sensor is positioned such that the optical sensor is able to scan any optically machine-readable representation of VPD of any non-active component when installed in the computer system;
- decoding the optically machine-readable representation of the VPD to determine the VPD of the non-active component; and
- storing the determined VPD of the non-active component.

9. The method of claim 8, wherein the optically machine-readable representation of the VPD of the non-active component is a QR code.

10. The method of claim 8, wherein the optically machine-readable representation of the VPD of the non-active component is a barcode.

11. The method of claim 8, further comprising the steps of:
- the computer system determining that the determined VPD of the non-active component does not match a previously stored VPD; and
- the computer system alerting that the determined VPD of the non-active component does not match the previously stored VPD and that the non-active component corresponding to the determined VPD has been installed.

12. The method of claim 8, wherein the non-active component is a component that does not contain transistors or active circuitry, and does not contain memory containing VPD.

13. The method of claim 12, wherein the component that does not contain transistors or active circuitry, and does not contain memory containing VPD is selected from the group consisting of an expansion card, midplane, riser card, planar, chassis, cable, and adapter card.

14. The method of claim 8, further comprising the steps of:
- the computer system determining that the determined VPD of the non-active component does not match a previously stored VPD; and
- the computer system alerting that the determined VPD of the non-active component does not match the previously stored VPD and that a non-active component corresponding to the previously stored VPD has been removed.

* * * * *